United States Patent
Wexler et al.

(10) Patent No.: US 8,527,649 B2
(45) Date of Patent: Sep. 3, 2013

(54) MULTI-STREAM BIT RATE ADAPTATION

(75) Inventors: Yosef Wexler, Shimshit (IL); Amir Shatz, Zur Yigal (IL); Ilan Daniel, Ramat Gan (IL); Yosef Ben-Tsur, Zur Yigal (IL)

(73) Assignee: Mobixell Networks Ltd., Ra'anana (IL)

( * ) Notice: Subject to any disclaimer, the term of this patent is extended or adjusted under 35 U.S.C. 154(b) by 182 days.

(21) Appl. No.: 13/041,398

(22) Filed: Mar. 6, 2011

(65) Prior Publication Data

US 2011/0225315 A1 Sep. 15, 2011

Related U.S. Application Data

(60) Provisional application No. 61/311,785, filed on Mar. 9, 2010.

(51) Int. Cl.
*G06F 15/16* (2006.01)
(52) U.S. Cl.
USPC ............ 709/231; 709/203; 709/214; 709/216
(58) Field of Classification Search
USPC .................................. 709/203, 214, 216, 231
See application file for complete search history.

(56) References Cited

U.S. PATENT DOCUMENTS

| | | |
|---|---|---|
| 5,161,044 A | 11/1992 | Nazarathy et al. |
| 5,253,309 A | 10/1993 | Nazarathy et al. |
| 5,278,923 A | 1/1994 | Nazarathy et al. |
| 5,282,072 A | 1/1994 | Nazarathy et al. |
| 5,424,680 A | 6/1995 | Nazarathy et al. |
| 5,940,196 A | 8/1999 | Piehler et al. |
| 5,987,019 A | 11/1999 | Raith et al. |
| 6,038,257 A | 3/2000 | Brusewitz et al. |
| 6,169,843 B1 | 1/2001 | Lenihan et al. |
| 6,285,252 B1 | 9/2001 | Huang |
| 6,304,369 B1 | 10/2001 | Piehler |
| 6,310,915 B1 | 10/2001 | Wells et al. |
| 6,381,465 B1 | 4/2002 | Chern et al. |
| 6,442,603 B1 | 8/2002 | Borella |
| 6,463,102 B1 | 10/2002 | Linzer |
| 6,466,568 B1 | 10/2002 | Raith et al. |
| 6,490,298 B1 | 12/2002 | Chin et al. |

(Continued)

FOREIGN PATENT DOCUMENTS

EP 1439707 A3 1/2006

OTHER PUBLICATIONS

Pantos, R., "HTTP Live Streaming", IETF Internet Draft, Apr. 2, 2010.
Apple Inc., "HTTP Live Streaming Overview", USA, Mar. 25, 2010.

(Continued)

*Primary Examiner* — Phuoc Nguyen
(74) *Attorney, Agent, or Firm* — D. Kligler I.P. Services Ltd.

(57) ABSTRACT

A method for communication includes providing an item of media content for streaming in a plurality of versions having different, respective bit rates. The media content is streamed from a server to a client by transmitting a first version of the item over a network at a first bit rate from the server to the client via a server buffer associated with the server and monitoring a fill level of the server buffer while streaming the media content. The server switches to transmitting a second version of the item at a second bit rate, different from the first bit rate, to the client in response to a change in the fill level of the server buffer.

20 Claims, 3 Drawing Sheets

(56) References Cited

U.S. PATENT DOCUMENTS

| | | | |
|---|---|---|---|
| 6,490,727 B1 | 12/2002 | Nazarathy et al. | |
| 6,563,517 B1 | 5/2003 | Bhagwat et al. | |
| 6,674,796 B1 | 1/2004 | Haskell et al. | |
| 6,711,300 B2 | 3/2004 | Fisher et al. | |
| 6,727,915 B2 | 4/2004 | Coleman et al. | |
| 6,806,863 B1 | 10/2004 | Howard | |
| 6,853,379 B2 | 2/2005 | Buddemeier et al. | |
| 6,876,364 B2 | 4/2005 | Buddemeier et al. | |
| 6,931,159 B2 | 8/2005 | Ridge | |
| 6,937,770 B1* | 8/2005 | Oguz et al. | 382/235 |
| 6,948,131 B1 | 9/2005 | Neven et al. | |
| 6,952,212 B2 | 10/2005 | Nister et al. | |
| 6,970,602 B1 | 11/2005 | Smith et al. | |
| 6,981,045 B1 | 12/2005 | Brooks | |
| 6,995,769 B2 | 2/2006 | Ordentlich et al. | |
| 7,024,045 B2 | 4/2006 | McIntyre | |
| 7,039,251 B2 | 5/2006 | Fisher et al. | |
| 7,047,305 B1 | 5/2006 | Brooks et al. | |
| 7,069,573 B1 | 6/2006 | Brooks et al. | |
| 7,107,039 B2 | 9/2006 | Liao et al. | |
| 7,114,174 B1 | 9/2006 | Brooks et al. | |
| 7,143,432 B1 | 11/2006 | Brooks et al. | |
| 7,162,584 B2 | 1/2007 | Adl-Tabatabai et al. | |
| 7,242,871 B2 | 7/2007 | Huang et al. | |
| 7,257,641 B1 | 8/2007 | VanBuskirk et al. | |
| 7,260,826 B2 | 8/2007 | Zhang et al. | |
| 7,277,588 B2 | 10/2007 | Fisher et al. | |
| 7,298,360 B2 | 11/2007 | Howard | |
| 7,305,139 B2 | 12/2007 | Srinivasan et al. | |
| 7,324,597 B2 | 1/2008 | Mahkonen et al. | |
| 7,339,993 B1 | 3/2008 | Brooks et al. | |
| 7,342,884 B2 | 3/2008 | Chen et al. | |
| 7,369,709 B2 | 5/2008 | Hsu et al. | |
| 7,376,153 B2 | 5/2008 | Coleman et al. | |
| 7,412,102 B2 | 8/2008 | Sirivasan et al. | |
| 7,428,342 B2 | 9/2008 | Tu et al. | |
| 7,430,329 B1 | 9/2008 | Sarna | |
| 7,439,982 B2 | 10/2008 | Deniau et al. | |
| 7,444,418 B2 | 10/2008 | Chou et al. | |
| 7,450,571 B2 | 11/2008 | Zhang et al. | |
| 7,471,726 B2 | 12/2008 | Srinivasan | |
| 7,471,850 B2 | 12/2008 | Srinivasan | |
| 7,474,796 B1 | 1/2009 | Fisher et al. | |
| 7,483,487 B2 | 1/2009 | Liu et al. | |
| 7,551,780 B2 | 6/2009 | Nudd et al. | |
| 7,551,789 B2 | 6/2009 | Tu et al. | |
| 7,559,078 B2 | 7/2009 | Zhang et al. | |
| 7,571,246 B2 | 8/2009 | Virdi et al. | |
| 8,392,748 B2 | 3/2013 | Bocharov et al. | |
| 2001/0047517 A1 | 11/2001 | Christopoulos et al. | |
| 2002/0009286 A1 | 1/2002 | Kasutani | |
| 2002/0090140 A1 | 7/2002 | Thirsk | |
| 2002/0138619 A1 | 9/2002 | Ramaley et al. | |
| 2002/0156842 A1 | 10/2002 | Signes et al. | |
| 2002/0169823 A1 | 11/2002 | Coulombe et al. | |
| 2002/0172418 A1 | 11/2002 | Hu | |
| 2002/0177454 A1 | 11/2002 | Karri et al. | |
| 2003/0135867 A1 | 7/2003 | Guedalia | |
| 2003/0222883 A1 | 12/2003 | Deniau et al. | |
| 2004/0165783 A1 | 8/2004 | Reynolds et al. | |
| 2004/0218586 A1 | 11/2004 | Khoury et al. | |
| 2004/0240390 A1 | 12/2004 | Seckin | |
| 2004/0244003 A1 | 12/2004 | Perfetto et al. | |
| 2004/0252238 A1 | 12/2004 | Park et al. | |
| 2004/0252904 A1 | 12/2004 | Fisher et al. | |
| 2004/0267952 A1 | 12/2004 | He et al. | |
| 2005/0002401 A1 | 1/2005 | Coleman et al. | |
| 2005/0025504 A1 | 2/2005 | Huang et al. | |
| 2005/0089043 A1 | 4/2005 | Seckin et al. | |
| 2005/0122427 A1 | 6/2005 | Hougui et al. | |
| 2005/0155080 A1 | 7/2005 | Zhang et al. | |
| 2006/0026294 A1 | 2/2006 | Virdi et al. | |
| 2006/0064645 A1 | 3/2006 | Neven et al. | |
| 2006/0085541 A1 | 4/2006 | Cuomo | |
| 2006/0141923 A1 | 6/2006 | Goss | |
| 2006/0156200 A1 | 7/2006 | Zhang et al. | |
| 2006/0156201 A1 | 7/2006 | Zhang et al. | |
| 2006/0245659 A1 | 11/2006 | Fisher et al. | |
| 2006/0271683 A1 | 11/2006 | Ramaley et al. | |
| 2007/0053437 A1 | 3/2007 | Muller et al. | |
| 2007/0056000 A1 | 3/2007 | Pantalone et al. | |
| 2007/0061862 A1 | 3/2007 | Berger et al. | |
| 2007/0067818 A1 | 3/2007 | Hjelm | |
| 2007/0085931 A1 | 4/2007 | Guionnet et al. | |
| 2007/0092147 A1 | 4/2007 | Guionnet et al. | |
| 2007/0277208 A1 | 11/2007 | Asbun et al. | |
| 2008/0005246 A1 | 1/2008 | VanBuskirk et al. | |
| 2008/0046939 A1 | 2/2008 | Lu et al. | |
| 2008/0052414 A1 | 2/2008 | Panigrahi et al. | |
| 2008/0062322 A1 | 3/2008 | Dey et al. | |
| 2008/0086570 A1 | 4/2008 | Dey et al. | |
| 2008/0098446 A1 | 4/2008 | Seckin et al. | |
| 2008/0101461 A1 | 5/2008 | Person et al. | |
| 2008/0133766 A1* | 6/2008 | Luo | 709/231 |
| 2008/0158336 A1 | 7/2008 | Benson et al. | |
| 2008/0162670 A1 | 7/2008 | Chapweske et al. | |
| 2008/0165861 A1 | 7/2008 | Wen et al. | |
| 2008/0196076 A1 | 8/2008 | Shatz et al. | |
| 2008/0205291 A1 | 8/2008 | Li et al. | |
| 2008/0235749 A1 | 9/2008 | Jain et al. | |
| 2008/0301317 A1 | 12/2008 | Lee et al. | |
| 2009/0016435 A1* | 1/2009 | Brandsma et al. | 375/240.12 |
| 2009/0019149 A1 | 1/2009 | Cohen et al. | |
| 2009/0021585 A1 | 1/2009 | Ko et al. | |
| 2009/0022159 A1 | 1/2009 | Coleman et al. | |
| 2009/0037279 A1 | 2/2009 | Chockalingam et al. | |
| 2009/0080525 A1 | 3/2009 | Haskell et al. | |
| 2009/0083279 A1 | 3/2009 | Hasek | |
| 2009/0103899 A1 | 4/2009 | Lessing | |
| 2009/0106663 A1 | 4/2009 | Pirie et al. | |
| 2009/0122877 A1 | 5/2009 | Haskell | |
| 2009/0122878 A1 | 5/2009 | Liu et al. | |
| 2009/0168649 A1 | 7/2009 | Assouline et al. | |
| 2009/0172762 A1 | 7/2009 | Assouline et al. | |
| 2009/0172763 A1 | 7/2009 | Liu | |
| 2009/0178089 A1 | 7/2009 | Picco et al. | |
| 2009/0185618 A1 | 7/2009 | Liu et al. | |
| 2009/0185619 A1 | 7/2009 | Taleb et al. | |
| 2009/0265417 A1 | 10/2009 | Svendsen et al. | |
| 2009/0300203 A1* | 12/2009 | Virdi et al. | 709/231 |
| 2009/0307368 A1* | 12/2009 | Sriram et al. | 709/231 |
| 2010/0131671 A1 | 5/2010 | Kohli et al. | |
| 2010/0217888 A1* | 8/2010 | Ukita et al. | 709/234 |
| 2010/0223407 A1 | 9/2010 | Dong et al. | |
| 2010/0235528 A1 | 9/2010 | Bocharov et al. | |
| 2010/0312828 A1 | 12/2010 | Besserglick et al. | |
| 2010/0312905 A1* | 12/2010 | Sandmann et al. | 709/231 |
| 2012/0263241 A1 | 10/2012 | Swenson et al. | |
| 2012/0278449 A1 | 11/2012 | Wu et al. | |

OTHER PUBLICATIONS

Schwarz et al., "Overview of the Scalable Video Coding Extension of the H.264/AVC Standard", IEEE Transactions on Circuits and Systems for Video Technology, vol. 17, No. 9, pp. 1103-1120, Sep. 2007.

Ozbek et al., "A Survey on the H.264/AVC Standard", Turkish Journal of Electric Engineering & Computer Sciences, vol. 13, No. 3, pp. 287-302, year 2005.

Braden, R., "Requirements for Internet Hosts—Communication Layers", Network Working Group, RFC1122, Oct. 1989.

Allman et al., "TCP Congestion Control", Network Working Group, RFC5681, Sep. 2009.

U.S. Appl. No. 61/365,365, filed Jul. 19, 2010.

Lum et al., "A Context-Aware Decision Engine for Content Adaptation", IEEE Pervasive Computing Journal, vol. 1, issue 3, pp. 41-49, Jul.-Sep. 2002.

Vetro et al., "Video Transcoding Architectures and Techniques: An Overview", IEEE Signal Processing Magazine, vol. 20, No. 2, pp. 18-29, Mar. 2003.

U.S. Appl. No. 61/447,116, filed Feb. 28, 2011.

Keys, R.G., "Cubic Convolution Interpolation for Digital Image Processing", IEEE Transactions on Acoustics, Speech and Signal Processing, vol. ASSP-29, No. 6, pp. 1153-1160, Dec. 1981.

Ke et al., "Efficient Near-Duplicate Detection and Sub-Image Retrieval", Proceedings of the 12th Annual ACM International Conference on Multimedia, New York, USA, Oct. 10-16, 2004.

Chang et al., "RIME: A Replicated Image Detector for the World-Wide Web", Proceedings of SPIE Symposium of Voice, Video and Data Communications, Boston, USA, pp. 58-67, Nov. 1998.

Tan et al., "A Framework for Measuring Video Similarity and its Application to Video Query by Example", IEEE International Conference on Image Processing, vol. 2, pp. 106-110, Kobe, Japan, Oct. 24-29, 1999.

Ganchev et al., "Comparative Evaluation of Various MFCC Implementations on the Speaker Verification Task", 10th International Conference on Speech and Computer, vol. 1, pp. 191-194, University of Patras, Greece, Oct. 17-19, 2005.

Haitsma et al., "A Highly Robust Audio Fingerprinting System", IRCAM—Centre Pompidou, Paris, France, Oct. 13-17, 2002.

CCITT., "Terminal Equipment and Protocols for Telematic Services; Compression and Coding of Continuous-Tone Still Images—Requirements and Guidelines", Recommendation T.81, Sep. 1992.

Intel Inc., "Integrated Performance Primitives 5.3", Jun. 29, 2008.

Compuserve Inc., "Graphics Interchange Format Programming Reference", version 89a, Jul. 31, 1990.

World Wide Web Consortium (W3C), "Portable Network Graphics (PNG) Specification (2nd edition); Information Technology—Computer Graphics and Image Processing—Portable Network Graphics (PNG): Functional Specification", Nov. 10, 2003.

U.S. Appl. No. 13/184,739, filed Jul. 18, 2011.

U.S. Appl. No. 12/791,013 Office action dated Jan. 9, 2013.

U.S. Appl. No. 12/791,013 Office Action dated Jul. 11, 2013.

U.S. Appl. No. 13/405,310 Office Action dated May 29, 2013.

\* cited by examiner

MULTI-STREAM BIT RATE ADAPTATION

CROSS-REFERENCE TO RELATED APPLICATION

This application claims the benefit of U.S. Provisional Patent Application 61/311,785, filed Mar. 9, 2010, which is incorporated herein by reference.

FIELD OF THE INVENTION

The present invention relates generally to data communications, and specifically to methods and systems for transmitting digital media over a network.

BACKGROUND OF THE INVENTION

Various methods have been developed for streaming multimedia content, such as audio and video, over packet communication networks. "Streaming" in this context means that the client plays the content (i.e., displays the corresponding images and/or generates sound) simultaneously with receiving the media data over the network, although there may be a small lag due to buffering at the client side. The streamed content may be either live or pre-recorded.

If multimedia content is encoded at a bit rate that exceeds the available transmission bandwidth to a given client, the content received by the client will be degraded or possibly unusable. Various solutions have therefore been proposed to enable the data transmission rate to be adjusted to fit the resources, such as bandwidth and processing capabilities, of each client. For example, U.S. Pat. No. 7,444,418, whose disclosure is incorporated herein by reference, describes a method in which the available transmission rate of a downlink channel is estimated by calculating packet round trip times and congestion windows. If the transmission rate at which the multimedia information is encoded is greater than the available transmission rate, the multimedia information is transcoded to conform to the available transmission rate.

Another method for controlled media streaming is described in U.S. Patent Application Publication 2010/0312828, whose disclosure is also incorporated herein by reference. This publication describes a method for data communications in which a server conveys to a client a virtual index file, which identifies multiple sequences of media files available for download to the client. The index file includes a plurality of sequences that contain a given item of streaming content for download to the client at a different, respective data rate for each sequence. A selection is received from the client of a sequence among the plurality of the sequences of the media files. Responsively to the selection, the media files in the sequence are created at the respective data rate and are downloaded to the client.

Scalable Video Coding (SVC) enables the transmission and decoding of partial bit streams to provide video services with lower temporal or spatial resolution or reduced fidelity. SVC has been standardized in Annex G of the H.264/MPEG-4 AVC video compression standard. A useful survey of the features and capabilities of SVC is provided by Schwarz et al., in "Overview of the Scalable Video Coding Extension of the H.264/AVC Standard," *IEEE Transactions on Circuits and Systems for Video Technology* 17:9 (2007), pages 1103-1120, which is incorporated herein by reference.

SUMMARY

Embodiments of the present invention that are described hereinbelow provide methods for media streaming with enhanced server-side control.

There is therefore provided, in accordance with an embodiment of the present invention, a method for communication, including providing an item of media content for streaming in a plurality of versions having different, respective bit rates. The media content is streamed from a server to a client by transmitting a first version of the item over a network at a first bit rate from the server to the client via a server buffer associated with the server, and monitoring a fill level of the server buffer while streaming the media content. The server switches to transmitting a second version of the item at a second bit rate, different from the first bit rate, to the client in response to a change in the fill level of the server buffer.

In a disclosed embodiment, providing the item of media content includes receiving and transcoding an original item at a full bit rate so as to generate the versions at multiple partial bit rates. Typically, the media content includes a video stream, and at least some of the versions have different, respective frame rates.

In some embodiments, transmitting the first and second versions includes transmitting data packets over the network from the server to the client, and the method includes receiving messages at the server from the client that report receipt of the data packets, and controlling the fill level of the server buffer responsively to the received messages. In one embodiment, the data packets are transmitted in accordance with a Transmission Control Protocol (TCP), wherein the server buffer includes a TCP send buffer, and wherein the messages from the client include TCP acknowledgments.

In disclosed embodiments, monitoring the fill level includes comparing the fill level to at least an upper threshold and a lower threshold, and switching to transmitting the second version includes switching to a lower bit rate when the fill level passes above the upper threshold, and switching to a higher bit rate when the fill level passes below the lower threshold. When the media content includes a compressed video stream including I-frames and P-frames, switching to transmitting the second version may include switching to the lower bit rate when the fill level passes above an upper margin, lower than the upper threshold, and switching to the higher bit rate when the fill level passes below a lower margin, higher than the lower threshold, and an I-frame is encountered in the compressed video stream. Additionally or alternatively, the method includes defining a buffer danger level above the upper threshold, wherein switching to the lower bit rate includes reducing the bit rate by one increment when the fill level passes above the upper margin but is below the buffer danger level, and reducing the bit rate by multiple increments in a single step when the fill level passes above the buffer danger level.

There is also provided, in accordance with an embodiment of the present invention, a method for communication, including providing an item of video content for streaming in a plurality of versions, at least two of the versions having different, respective frame rates. The video content is streamed from a server to a client by transmitting a first version of the item over a network at a first frame rate from the server to the client. In response to a change in transmission conditions, the server switches to transmitting a second version of the item at a second frame rate, different from the first frame rate, from the server to the client.

Typically, providing the item of video content includes receiving and transcoding an original item at a full frame rate so as to generate the versions at multiple partial frame rates.

In some embodiments, providing the item of video content includes aligning the versions so that at least some first frames in the first version are synchronized with respective second frames in the second version. When the video content includes a compressed video stream including I-frames and P-frames, and switching to transmitting the second version may include switching to the second version at one of the P-frames.

There is additionally provided, in accordance with an embodiment of the present invention, communication apparatus, including a media source, which is configured to provide an item of media content for streaming in a plurality of versions having different, respective bit rates. A client interface includes a buffer and is configured to stream the media content from the source to a client by transmitting a first version of the item over a network at a first bit rate via the buffer to the client, to monitor a fill level of the buffer while streaming the media content, and to switch to transmitting a second version of the item at a second bit rate, different from the first bit rate, in response to a change in the fill level of the buffer.

There is further provided, in accordance with an embodiment of the present invention, communication apparatus, including a media source, which is configured to provide an item of video content for streaming in a plurality of versions, at least two of the versions having different, respective frame rates. A client interface is configured to stream the video content from the source to a client by transmitting a first version of the item over a network to the client at a first frame rate, and in response to a change in transmission conditions, to switch to transmitting a second version of the item to the client at a second frame rate, different from the first frame rate.

The present invention will be more fully understood from the following detailed description of the embodiments thereof, taken together with the drawings in which:

DETAILED DESCRIPTION OF EMBODIMENTS

Figure 1:
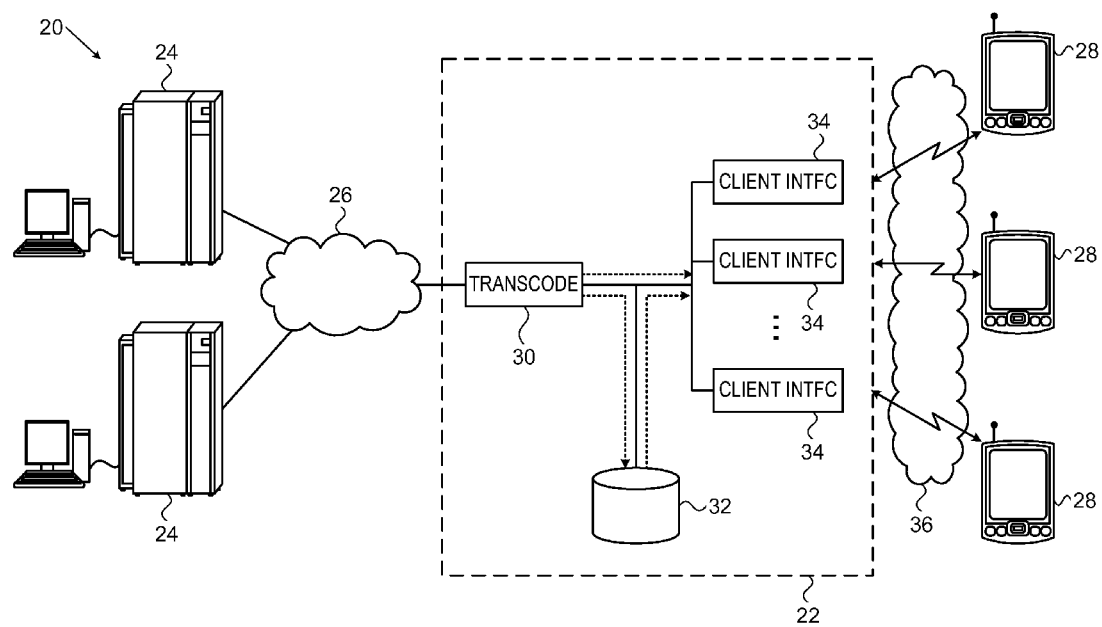
FIG. 1 is a block diagram that schematically illustrates a communication system, in accordance with an embodiment of the present invention.

In media streaming operations over communication networks, many clients may receive a given item of media content simultaneously from the same server. Typically—and particularly in wireless mobile network environments—different clients may have different media playback capabilities, and the available bandwidths between the server and different clients may dynamically vary over a wide range. It is therefore desirable that the server transmit different versions of the content item at different bit rates, which optimally match the available bandwidth and capabilities of each client, so that each client receives the best possible reproduction of the media content.

In embodiments of the present invention that are described hereinbelow, multiple different versions of a given item of streaming media content are provided, each with a different bit rate. In the case of video content, some of the versions may have different frame rates. The different versions may be generated by transcoding an original, full-bit-rate version of the media content item, either on the fly or off-line followed by storage of the different versions in a memory for readout as needed. For each client, the server monitors the progress of transmission to each client and selects the appropriate version to transmit accordingly. Based on this monitoring, the server may from time to time switch to transmitting a different version to the client. This arrangement enables the server to provide a large number of clients with optimized media streams, without necessarily requiring any special client-side capabilities.

In some embodiments, the server streams the media content to clients via server buffers, which mirror the presumed condition of the corresponding client device buffers. Typically, the server controls the fill level of each server buffer based on messages that it receives from the corresponding client, which report receipt of the streaming data. These messages and buffer control functions may be associated with and controlled by the media streaming application running on the server, or they may alternatively be associated with the flow control functionality of the applicable communication protocol (such as TCP acknowledgment messages), and may run on the server at the kernel level or even in hardware. By the same token, some embodiments of the present invention make use of an actual protocol buffer, such as the TCP send buffer, while in other embodiments the server buffer may be a virtual buffer that simply models the amount of data in the network.

In any case, the server monitors the fill level of the server buffer while streaming the media content and generally tries to maintain the buffer fill level in an intermediate range, in which the bit rate of the encoded media is roughly matched to the available streaming rate of the network. When the fill level of the server buffer changes by more than some threshold amount, the server switches to transmitting a different version of the content item, at a higher or lower bit rate, in order to return the fill level to the intermediate range.

The embodiments described below are directed mainly (though not exclusively) to streaming of video content, and some of the different versions of a given video item may thus have different, respective frame rates. As a result, when the server switches the version and bit rate transmitted to a given client, it may make a change in the video frame rate. To facilitate frame rate changes, the versions are typically aligned so that at least some frames in each version are synchronized with respective frames in other versions at different frame rates. When transmitting compressed video streams that comprise I-frames and P-frames, such as MPEG streams, the synchronization of the different versions makes it possible to switch versions immediately at the P-frames, rather than having to wait to switch at an I-frame (which could take several seconds).

FIG. 1 is a block diagram that schematically illustrates a communication system 20, in accordance with an embodiment of the present invention. A media server 22 receives various items of media content (such as video programs) from one or more content servers 24, typically via a network 26, such as the Internet or an intranet. Server 22 distributes the content to multiple clients 28 concurrently in response to client requests (possibly as a multicast, or video-on-demand service). Clients 28 are pictured in FIG. 1 as mobile devices, which communicate with server 22 over wireless links, via a cellular network 36, for example. Such clients may comprise, for example, cell phones, personal digital assistants, or portable media players, for example. Alternatively or additionally, clients 28 may comprise personal computers or television set-top boxes (not shown), which communicate with server 22 over either wireless or wired links.

Server 22 typically comprises a general-purpose computer or a cluster of such computers, with suitable interfaces, one or more processors, and software for carrying out the functions that are described herein. The software may be downloaded to the computer in electronic form, over a network, for example. Alternatively or additionally, the software may be held on tangible, non-transitory storage media, such as optical, magnetic, or electronic memory media. Further alternatively or additionally, at least some of the functions of server 22 may be performed by dedicated or programmable hardware logic circuits. For the sake of simplicity and clarity, only those elements of server 22 that are essential to an understanding of the present invention are shown in the figures.

Server 22 comprises a content adaptation module, referred to herein as a transcoder 30, which receives multiple channels of media content from content servers 24. The channel content may be live or pre-recorded. Although only a single transcoder is shown in the figures, server 22 may comprise multiple transcoders, such as a respective transcoder for each content channel that the server receives. Transcoder 30 typically generates multiple versions of each incoming content item, each at a different bit rate, as described in greater detail hereinbelow. The transcoder may generate these multiple versions on the fly, as the content comes in from servers 24 and streams out to clients 28. Alternatively or additionally, at least some of the transcoded versions may be stored in a memory 32 for subsequent readout when required. These stored versions may alternatively be transcoded by other equipment (not shown), external to server 22, and then uploaded to the server for storage in memory 32.

Multiple client interfaces 34 interact with respective clients 28, typically (although not necessarily) with an individual client interface for each client. Client interfaces 34 communicate with clients 28 via appropriate network connections and modems, which are known in the art and are omitted from the figures for the sake of simplicity. The client interfaces receive requests from clients to transmit certain content items, such as video programs, and in response convey the appropriate versions of the requested items (from transcoder 30 or memory 32) to the clients. The methods used by the client interfaces in selecting the appropriate versions are described in detail hereinbelow.

Typically, client interfaces 34 and clients 28 communicate with one another using suitable network transport protocols, such as the Transmission Control Protocol (TCP) or the Real-Time Transport Protocol (RTP). The embodiments described below focus on the use of TCP transport and associated messaging. An alternative embodiment based on RTP is described in the above-mentioned provisional patent application.

Figure 2:
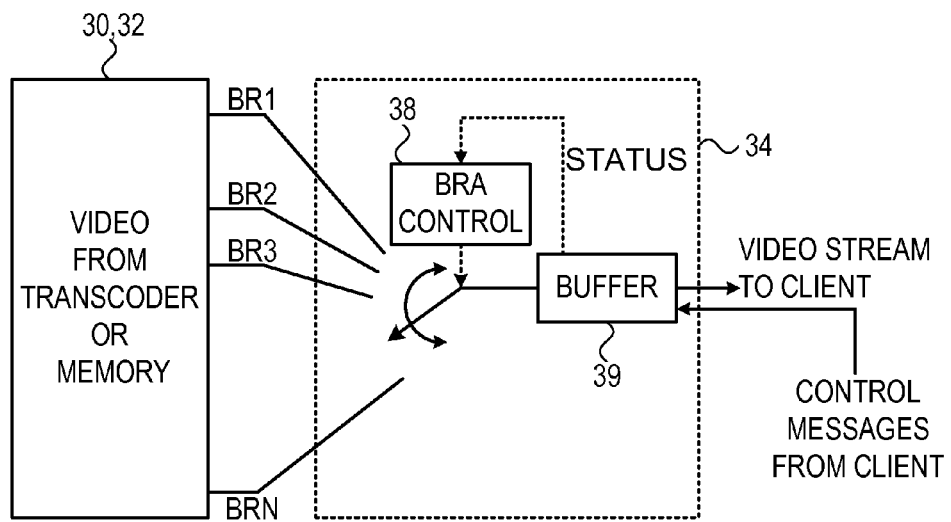
FIG. 2 is a block diagram that schematically illustrates a client interface, in accordance with an embodiment of the present invention.

FIG. 2 is a block diagram that schematically shows details of one of client interfaces 34, in accordance with an embodiment of the present invention. The figure illustrates the functionality of a single client interface, serving one client 28. This functionality is replicated for each client that is in communication with server 22. The blocks within client interface 34 in FIG. 2 are functional blocks, which do not necessary correspond to discrete physical components.

In the pictured embodiment, it is assumed that client 28 has selected an item of video content, such as a certain program or channel, to view. Client interface 34 retrieves the video content from a media source, which may be either transcoder 30, memory 32, or a combination of the two. The content is made available from the source to the client interface in N different versions at different, respective bit rates, labeled BR1, BR2, . . . , BRN in the figure. For the sake of simplicity, it will be assumed that BR1 represents the lowest bit rate, while BRN is the highest available bit rate, possibly corresponding to the original input content. A bit rate adaptation (BRA) controller 38 selects the version (and hence the bit rate) to transmit to the client at any given point and typically changes versions from time to time in the course of transmitting the content item, as described below. Different clients viewing the same content item may receive the same version or different versions, depending on the current selections of their respective client interfaces.

Client interface 34 transmits the stream of video content at the selected bit rate to client 28 via a server buffer 39. This buffer may be a dedicated, proprietary type of buffer, but in some embodiments the client interface takes advantage of standard buffering that is a part of the transport protocol, such as TCP, that it uses in communicating with the client. The server may fill the buffer at the full available data rate, or may alternatively fill the buffer at the bit rate of the encoded media. The buffer fill level is controlled by client interface 34 based on control messages, such as TCP acknowledgments, that the client interface receives from client 28. BRA controller 38 receives status information from buffer 39 indicating the fill level, and may change its selection of the video version (and bit rate) in response to changes in the buffer level. This buffer-based BRA mechanism is described in detail hereinbelow.

Figure 3:
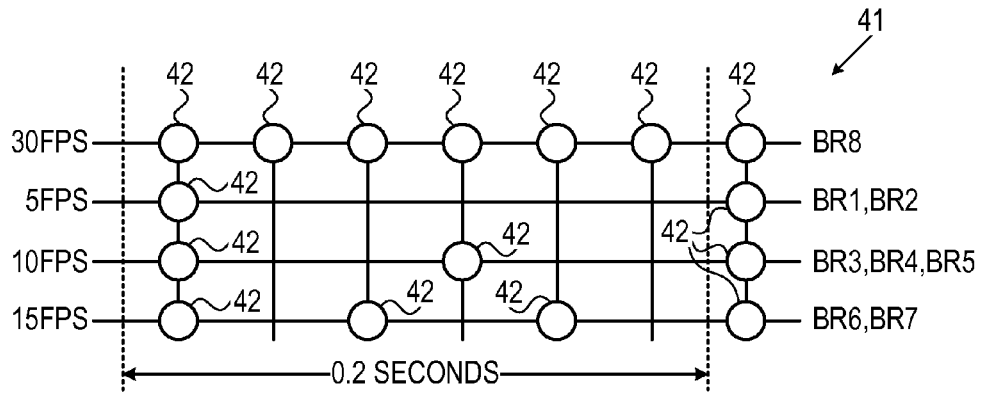
FIG. 3 is a timing diagram that schematically illustrates frames of a media stream at a number of different bit rates and frame rates, in accordance with an embodiment of the present invention.

FIG. 3 is a timing diagram that schematically illustrates frames 42 of a video stream 41 at a number of different bit rates, in accordance with an embodiment of the present invention. A source video stream, at the full frame rate of thirty frames per second (fps), is labeled BR8. FIG. 3 shows a segment of stream 41 that is 0.2 sec long, containing six frames 42 of the BR8 stream. Transcoder 30 generates seven subsidiary streams at lower bit rates, ranging from 40 kbps to 280 kbps:

BR1—40 kbps, 5 fps
BR2—80 kbps, 5 fps
BR3—120 kbps, 10 fps
BR4—160 kbps, 10 fps
BR5—200 kbps, 10 fps
BR6—240 kbps, 15 fps
BR7—280 kbps, 15 fps The streams are compressed, typically using both intra-coding of individual frames and predictive coding of sequences of frames, as is known in the art and is used widely in MPEG-standard compression.

As shown in FIG. 3, the frames of the different versions are temporally aligned, and coincident frames in different versions will therefore have the same timestamps. This synchronization is useful in facilitating fast, clean transitions between versions, without having to wait for an Intra (I) frame to make the transition. Rather, as a result of the synchronization, a Predictive (P) frame occurring immediately after a transition to a new frame rate can be treated by client 28 as referring back to the most recent P or I frame in the stream at the previous frame rate. Thus, for example, if a transition from BR2 (5 fps) to BR3 (10 fps) occurs during the 0.2 sec interval shown in the figure, the next BR3 P-frame can be referred back to the first BR2 P-frame in the interval for reconstruction.

This synchronization of the different versions permits BRA controller 38 to make version transitions with a granularity of less than 0.2 sec. By comparison, I-frames typically occur roughly once every 3-5 sec. Although switching versions at I-frames may give better video quality at the transition, limiting version changes to I-frames reduces the ability of the BRA controller to adapt promptly to changes in network conditions.

Figure 4:
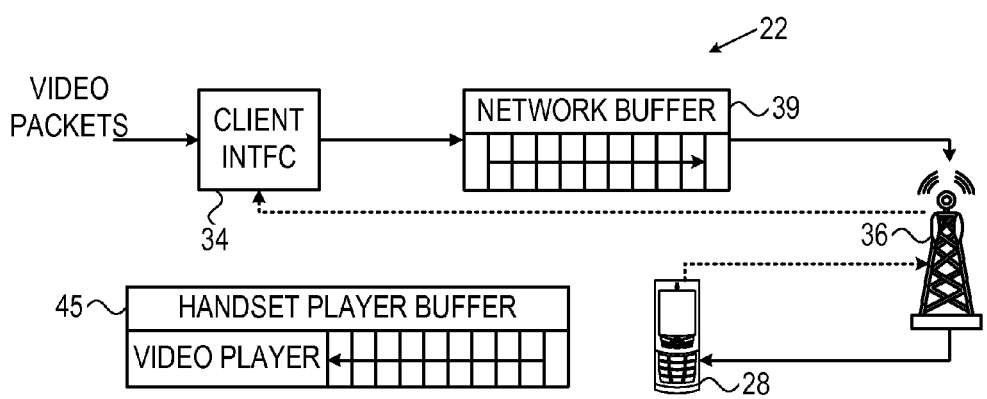
FIG. 4 is a block diagram that schematically shows an interaction of buffers in a communication system, in accordance with an embodiment of the present invention.

FIG. 4 is a block diagram that schematically illustrates how client interface 34 uses buffer 39 in controlling its transmission bit rate, in accordance with an embodiment of the present invention. In this model, the client interface assumes that buffer 39 mirrors a client buffer 45 maintained by client 28. A video player in client 28 reads and decompresses the video data from buffer 45 for playback on the client. The object of BRA controller 38 is to keep client buffer 45 at an intermediate fill level, since overflow of the client buffer will result in dropped packets, while underflow may cause the video playback on the client to freeze or repeat a segment or even to terminate the connection with server 22.

Because client interface 34 is not able to monitor client buffer 45 directly, it uses the fill level of server buffer 39 as an indicator: An increase in the fill level of buffer 39 indicates that the data flow via network 36 to client 28 is slower than the bit rate of the current video version, meaning that the fill level of buffer 45 is decreasing. Conversely, a decrease in the fill level of buffer 39 indicates that the fill level of buffer 45 is increasing. Therefore, BRA controller 38 will generally switch to a version with a lower bit rate when buffer 39 fills to above a certain threshold level and will switch to a version with a higher bit rate when buffer 39 empties to below another, lower threshold level. As a result, the fill level of buffer 39 (and hence of buffer 45, as well) will tend to oscillate slowly above and below a desired, intermediate level. Details of this process are described below with reference to FIG. 5.

As noted earlier, server 22 uses messages from client 28 in controlling the level of buffer 39, wherein the messages may be application-level messages that are received and processed by client interface 34, or protocol-level messages that are received and processed by other components of the server. For example, when client interface 34 uses TCP connections and packets to transmit the streaming media to client 28, buffer 39 may comprise a TCP send buffer, as provided by TCP standards. These standards are summarized, for example, in Request for Comments (RFC) 1122 of the Internet Engineering Task Force (IETF), entitled "Requirements for Internet Hosts—Communication Layers" (1989), which is available at tools.ietf.org/html/rfc1122 and is incorporated herein by reference. TCP acknowledgment messages from client 28 indicate to server 22 how much more TCP data the client is prepared to receive at any given time, and the server then transmits data from buffer 39 accordingly, as is known in the art. TCP transmission and buffer fill level may be further regulated using congestion control features of TCP, as described, for example, by Allman et al. in IETF RFC 5681, entitled "TCP Congestion Control" (2009), which is available at tools.ietf.org/html/rfc5681 and is also incorporated herein by reference. Client interface 34 monitors the TCP send buffer level, and possibly other TCP state variables, in order to control the media transmission bit rate.

Figure 5:
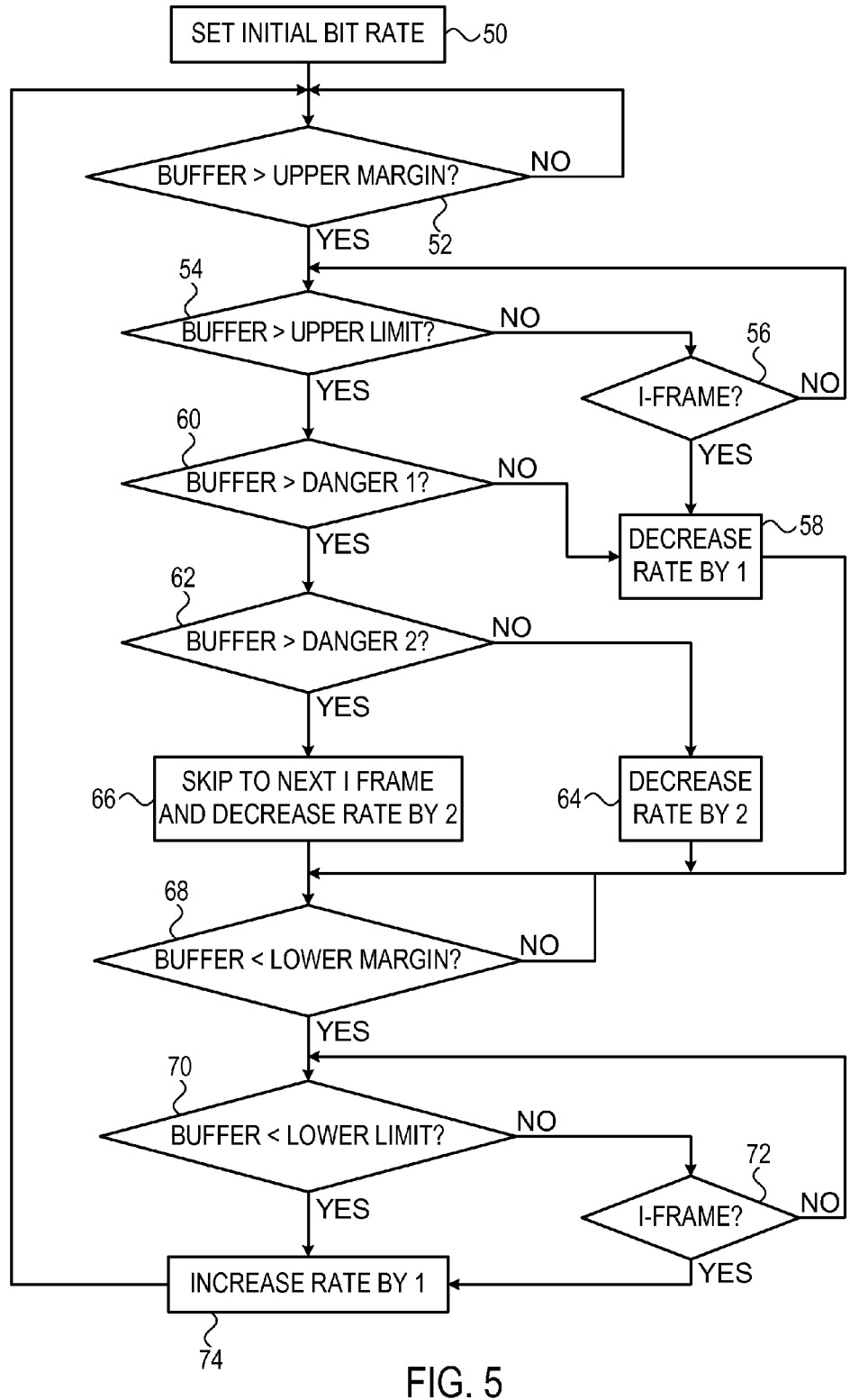
FIG. 5 is a flow chart that schematically illustrates a method for multi-rate media streaming, in accordance with an embodiment of the present invention.

FIG. 5 is a flow chart that schematically illustrates a method for multi-rate media streaming, in accordance with an embodiment of the present invention. This method is based on the buffer structure and control mechanisms that are described above.

The method of FIG. 5 attempts to maintain the fill level of server buffer 39 in the vicinity of a target, intermediate working level. The working level of buffer may be set, for example, to 65 kb. The following thresholds may then be set relative to the working level:

Upper and lower limits are set above and below the working level, for example 30 kb above and below the working level, at 95 and 35 kb respectively. These limits are generally the thresholds for switching to a lower or higher bit rate, respectively.

One or more "danger levels" may be set above the upper limit, corresponding to situations in which server buffer 39 is far overfilled and client buffer 45 may therefore be empty, or nearly so. In such cases, there is a risk not only that the video playback at client 28 will freeze or repeat, but also that the client will terminate the connection to server 22 altogether. In the present example, two danger levels of this sort are defined: Danger1 at 120 kb, and Danger2 at 150 kb.

In addition, upper and lower margins may be set a small distance below the upper limit and above the lower limit, respectively, for example at 85 and 45 kb, for reasons that are explained below.

BRA controller 38 makes or receives an initial estimate of the available network bit rate for transmission to client 28, and chooses one of the available video versions accordingly, at an initial rate selection step 50. In this example it is assumed that the video version is initially selected "optimistically," with an initial bit rate that is a little higher than the estimated network bit rate. The objective of the method generally is to choose video versions with bit rates as close as possible to the network bit rate, so that buffer 39 will fill and empty slowly.

BRA controller 38 periodically checks the fill level of buffer 39 against the upper margin, at an upper margin checking step 52. When the buffer level has reached the upper margin, the BRA controller continues to check whether the buffer level has continued to rise to the upper limit, at an upper limit checking step 54. As long as the upper limit has not yet been reached, the BRA controller checks the video stream itself to find the next I-frame, at an I-frame checking step 56. It is desirable, for the sake of video quality, to switch between streams at I-frames. Therefore, upon encountering an I-frame at step 56, the BRA controller will decrease the bit rate by one increment (for example, from BR3 to BR2), at a version decrementing step 58, even if the buffer has not yet reached the upper limit.

Otherwise, if the buffer level reaches the upper limit before an I-frame is encountered, BRA controller 38 will decrement the bit rate at step 58 at one of the P-frames. If the change in bit rate involves a change in frame rate, the BRA controller may delay the transition slightly until it reaches a P-frame in the new video stream that can properly reference an earlier P- or I-frame in the previous stream.

In some circumstances, as may occur when a mobile client is handed over from one base station to another, for example, or when the network bandwidth is suddenly compromised, buffer 39 may reach the Danger1 level, at a first danger step 60, or even the Danger2 level, at a second danger step 62. In either case, BRA controller 38 will decrement the bit rate by a larger factor, typically by two increments (from BR4 to BR2, for example). If the buffer has reached only the Danger1 level, the BRA controller will delay the transition until it reaches either an I-frame or a P-frame in the new stream with a proper reference, as explained above, at a double decrement step 64. At the Danger2 level, the BRA controller will either immediately switch to an I-frame or to a P-frame with a proper reference if available, or will otherwise force skip mode encoding until the next I-frame, at an urgent decrement step 66.

After switching to a version with a lower bit rate at any of steps 58, 64 and 66, the bit rate of the video stream entering buffer 39 should now be lower than the available network bandwidth, and the buffer fill level will therefore gradually decrease. BRA controller 38 checks whether the buffer level has dropped below the lower margin, at a lower margin checking step 68. The BRA controller then continues to check whether the buffer level has dropped below the lower limit, at a lower limit checking step 70, and checks for the next I-frame in the stream, at an I-frame checking step 72. Upon reaching an I-frame at step 72, the BRA controller immediately switches to a video version with bit rate one increment higher, at a version incrementing step 74. Otherwise, upon reaching the lower limit at step 70, the BRA controller switches versions at step 74 at the next P-frame that has a proper reference.

After the bit rate has been incremented, the buffer fill level should begin to increase gradually. The BRA controller therefore continues at step 52 and proceeds through the steps of the method for the duration of the transmission. This sort of alternation between rising and falling buffer levels is the expected, normal course of affairs in media transmission in system 20. In practice, however, BRA controller 38 typically monitors the buffer fill against both the upper and lower limits continuously in order to detect and compensate for unexpected changes in the network transmission rate.

The inventors have tested the methods for bit rate control that are described above, and have found that they provide smooth delivery of video with good quality under both steady-state and variable network conditions. Test results are described in the above-mentioned provisional patent application.

Although the embodiments described above refer, for the sake of clarity, to particular system architectures and network communication protocols, the techniques used in these embodiments may similarly be implemented in other network settings and using other protocols. An alternative embodiment using RTP, for example, is described in the above-mentioned provisional patent application, as noted earlier. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
providing an item of media content comprising a compressed video stream, which comprises I-frames and P-frames, for streaming in a plurality of versions having different, respective bit rates; and
streaming the media content from a server to a client by:
transmitting a first version of the item over a network at a first bit rate from the server to the client via a server buffer associated with the server;
monitoring a fill level of the server buffer by comparing the fill level to at least an upper margin and a lower margin while streaming the media content; and
switching to transmitting a second version of the item at a second bit rate, different from the first bit rate, from the server to the client in response to a change in the fill level of the server buffer, wherein switching to transmitting the second version comprises switching to a lower bit rate when the fill level passes above the upper margin, and switching to the higher bit rate when the fill level passes below the lower margin, and an I-frame is encountered in the compressed video stream.

2. The method according to claim 1, wherein providing the item of media content comprises receiving and transcoding an original item at a full bit rate so as to generate the versions at multiple partial bit rates.

3. The method according to claim 1, wherein the media content comprises a video stream, and wherein at least some of the versions have different, respective frame rates.

4. The method according to claim 1, wherein transmitting the first and second versions comprises transmitting data packets over the network from the server to the client, and wherein the method comprises receiving messages at the server from the client that report receipt of the data packets, and controlling the fill level of the server buffer responsively to the received messages.

5. The method according to claim 4, wherein transmitting the data packets comprises transmitting in accordance with a Transmission Control Protocol (TCP), wherein the server buffer comprises a TCP send buffer, and wherein the messages from the client comprise TCP acknowledgments.

6. The method according to claim 1, and comprising defining a buffer danger level above the upper threshold, wherein switching to the lower bit rate comprises reducing the bit rate by one increment when the fill level passes above the upper margin but is below the buffer danger level, and reducing the bit rate by multiple increments in a single step when the fill level passes above the buffer danger level.

7. A method for communication, comprising:
providing an item of video content for streaming in a plurality of versions, at least two of the versions having different, respective frame rates; and
streaming the video content from a server to a client by:
transmitting a first version of the item over a network at a first frame rate from the server to the client;
monitoring a fill level of a buffer by comparing the fill level to at least an upper threshold and a lower threshold while streaming the video content; and
in response to the fill level passing above the upper threshold or below the lower threshold, switching to transmitting a second version of the item at a second frame rate, different from the first frame rate, from the server to the client.

8. The method according to claim 7, wherein providing the item of video content comprises receiving and transcoding an original item at a full frame rate so as to generate the versions at multiple partial frame rates.

9. The method according to claim 7, wherein providing the item of video content comprises aligning the versions so that at least some first frames in the first version are synchronized with respective second frames in the second version.

10. The method according to claim 9, wherein the video content comprises a compressed video stream comprising I-frames and P-frames, and wherein switching to transmitting the second version comprises switching to the second version at one of the P-frames.

11. Communication apparatus, comprising:
a media source, which is configured to provide an item of media content comprising a compressed video stream, which comprises I-frames and P-frames, for streaming in a plurality of versions having different, respective bit rates; and
a client interface, which comprises a buffer and is configured to stream the media content from the source to a client by transmitting a first version of the item over a network at a first bit rate via the buffer to the client, to monitor a fill level of the buffer while streaming the media content by comparing the fill level to at least an upper margin and a lower margin, and to switch to transmitting a second version of the item at a second bit rate, different from the first bit rate, in response to a change in the fill level of the buffer by switching to a lower bit rate when the fill level passes above the upper margin, and switching to the higher bit rate when the fill level passes below the lower margin, and an I-frame is encountered in the compressed video stream.

12. The apparatus according to claim 11, wherein the media source comprises a transcoder, which is configured to receive and transcode an original item at a full bit rate so as to generate the versions at multiple partial bit rates.

13. The apparatus according to claim 11, wherein the media content comprises a video stream, and wherein at least some of the versions have different, respective frame rates.

14. The apparatus according to claim 11, wherein the client interface is configured to transmit the first and second versions in data packets over the network to the client, and to receive messages at the server from the client that report receipt of the data packets, and to control the fill level of the buffer responsively to the received messages.

15. The apparatus according to claim 14, wherein the client interface is configured to transmit the data packets in accordance with a Transmission Control Protocol (TCP), wherein the buffer comprises a TCP send buffer, and wherein the messages from the client comprise TCP acknowledgments.

16. The apparatus according to claim 11, wherein a buffer danger level is defined above the upper threshold, and wherein the client interface is configured to reduce the bit rate by one increment when the fill level passes above the upper margin but is below the buffer danger level, and to reduce the bit rate by multiple increments in a single step when the fill level passes above the buffer danger level.

17. Communication apparatus, comprising:
a media source, which is configured to provide an item of video content for streaming in a plurality of versions, at least two of the versions having different, respective frame rates; and
a client interface, which is configured to stream the video content from the source to a client by transmitting a first version of the item over a network to the client at a first frame rate, monitoring a fill level of a buffer by comparing the fill level to at least an upper threshold and a lower threshold while streaming the video content, and in response to the fill level passing above the upper threshold or below the lower threshold, to switch to transmitting a second version of the item to the client at a second frame rate, different from the first frame rate.

18. The apparatus according to claim 17, wherein the media source comprises a transcoder, which is configured to receive and transcode an original item at a full frame rate so as to generate the versions at multiple partial frame rates.

19. The apparatus according to claim 17, wherein the versions are aligned at the source so that at least some first frames in the first version are synchronized with respective second frames in the second version.

20. The apparatus according to claim 19, wherein the video content comprises a compressed video stream comprising I-frames and P-frames, and wherein the client interface is configured to switch to the second version at one of the P-frames.

* * * * *